(12) United States Patent
Sato et al.

(10) Patent No.: US 8,992,793 B2
(45) Date of Patent: Mar. 31, 2015

(54) REFRIGERATION APPARATUS

(75) Inventors: Shigehiro Sato, Shiga (JP); Kenji Takaichi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 13/575,089

(22) PCT Filed: Jul. 28, 2010

(86) PCT No.: PCT/JP2010/063144
§ 371 (c)(1),
(2), (4) Date: Jul. 25, 2012

(87) PCT Pub. No.: WO2011/092881
PCT Pub. Date: Aug. 4, 2011

(65) Prior Publication Data
US 2012/0304687 A1    Dec. 6, 2012

(30) Foreign Application Priority Data
Feb. 1, 2010    (JP) ................................. 2010-020078

(51) Int. Cl.
*C09K 5/04* (2006.01)
*C10M 171/00* (2006.01)

(52) U.S. Cl.
CPC ........... C09K 5/045 (2013.01); *C09K 2205/126* (2013.01); *C09K 2205/22* (2013.01); *C09K 2205/24* (2013.01); C10M 171/008 (2013.01); *C10M 2207/2805* (2013.01); *C10M 2207/2835* (2013.01); *C10N 2220/026* (2013.01); *C10N 2220/028* (2013.01); *C10N 2220/302* (2013.01); *C10N 2230/12* (2013.01); *C10N 2230/64* (2013.01); *C10N 2240/30* (2013.01)
USPC ........................................... 252/68; 508/475

(58) Field of Classification Search
USPC ............................................ 252/68; 508/485
See application file for complete search history.

(56) References Cited

U.S. PATENT DOCUMENTS

| | | | |
|---|---|---|---|
| 2002/0017629 A1* | 2/2002 | Mosier et al. | ................... 252/71 |
| 2003/0057397 A1 | 3/2003 | Taira | |
| 2007/0155635 A1 | 7/2007 | Tagawa et al. | |
| 2008/0111100 A1 | 5/2008 | Thomas et al. | |
| 2010/0234256 A1 | 9/2010 | Sato et al. | |
| 2011/0000253 A1 | 1/2011 | Sato et al. | |
| 2011/0023535 A1 | 2/2011 | Morimoto et al. | |

FOREIGN PATENT DOCUMENTS

| | | |
|---|---|---|
| CN | 1415001 | 4/2003 |
| CN | 101583700 | 11/2009 |
| JP | 2004-204679 | 7/2004 |
| JP | 2009-235111 | 10/2009 |
| JP | 2011-016930 | 1/2011 |
| WO | WO 2009/066722 | 5/2009 |
| WO | WO 2009/116237 | 9/2009 |

\* cited by examiner

*Primary Examiner* — John Hardee
(74) *Attorney, Agent, or Firm* — Hamre, Schumann, Mueller & Larson, P.C.

(57) ABSTRACT

Use of a double bond-containing hydrofluoroolefin refrigerant causes a problem that it generates hydrogen fluoride by cleavage and decomposition under influence of oxygen, leading to degradation of the materials and the refrigeration oil used in the refrigeration apparatus and causing troubles in the refrigeration apparatus.
It is possible to provide a high-reliability longer-lasting refrigeration apparatus by inexpensive method, by using a double bond-containing hydrofluoroolefin refrigerant in a refrigerating cycle having a refrigerant circulation route extending from a compressor 1, via a condenser 2, an expansion mechanism 3, and an evaporator 4, back to the compressor 1 that contains an ester-based refrigeration oil containing an unsaturated fatty acid as a constituent fatty acid.

7 Claims, 2 Drawing Sheets

1: Compressor
2: Condenser
3: Expansion mechanism
4: Evaporator
5: Tubing
6: Four-way valve

Fig. 2

| Mixing ratio(wt%) | | Global warming potential of the two-component refrigerants | |
|---|---|---|---|
| HFO 1234yf | HFC | HFO1234yf +HFC32 | HFO1234yf +HFC125 |
| 0 | 100 | 675 | 3500 |
| 10 | 90 | 608 | 3150 |
| 20 | 80 | 541 | 2801 |
| 30 | 70 | 474 | 2451 |
| 40 | 60 | 407 | 2102 |
| 50 | 50 | 340 | 1752 |
| 56 | 44 | 299 | 1542 |
| 60 | 40 | 272 | 1402 |
| 70 | 30 | 205 | 1053 |
| 78.7 | 21.3 | 147 | 749 |
| 80 | 20 | 138 | 703 |
| 90 | 10 | 71 | 354 |
| 91.6 | 8.4 | 60 | 298 |
| 100 | 0 | 4 | 4 |

REFRIGERATION APPARATUS

TECHNICAL FIELD

The present invention relates to a refrigeration apparatus, employing a chlorine atom-free and carbon-carbon double bond-containing hydrofluoroolefin as its refrigerant, that contains a refrigeration oil enclosed therein and is equipped with a compressor, a condenser, an expansion mechanism and an evaporator.

BACKGROUND ART

Conventionally, hydrocarbon fluorides (HFCs) containing fluorine and hydrogen atoms have been used as refrigerants of air conditioners, car air conditioners and others. In addition, polar refrigeration oils such as polyalkylene glycol (PAG)s, polyol ester (POE)s and polyvinylether (PVE)s have been used in refrigeration cycles employing these HFCs as refrigerants, from the viewpoint of compatibility with the refrigerants. In such a refrigeration cycle, fluorine ions are often generated from the materials such as fluorine resins used therein. It is known that the ester-based refrigeration oil is then decomposed by the fluorine ions extracted into the refrigeration oil, resulting in corrosion of the metal sliding materials by the acid components and deterioration of the motor insulation paper. Thus in Patent Document 1, the amount of fluorine ions extracted from the fluorine resins was limited to a concentration of 1 ppm or less in the refrigeration oil, for example by previous heat treatment of the resins.

CITATION LIST

Patent Document 1:JP-A No. 2004-204679

SUMMARY OF INVENTION

Technical Problem

However, it was not possible in such conventional configurations to prevent generation of hydrogen fluoride by decomposition in reaction of the refrigerant hydrofluoroolefin with oxygen remaining in the refrigeration cycle in the regions at high temperature such as a sliding part in a compressor, and the materials used in the refrigeration cycle are often degraded.

An object of the present invention, which was made to solve the problems above, is to provide a refrigeration apparatus employing a hydrofluoroolefin-containing refrigerant and a refrigeration oil as working fluids that can be operated reliably for an extended period of time, as hydrogen fluoride is removed by reaction and deterioration of the components used in the refrigeration cycle is suppressed.

Solution to Problem

The refrigeration apparatus of the present invention, which solved the traditional problems above, employs an ester-based refrigeration oil containing an unsaturated fatty acid as constituent fatty acid, and a single refrigerant of carbon-carbon double bond hydrofluoroolefin or a mixed refrigerant containing the hydrofluoroolefin as primary component and a hydrofluorocarbon having no double bond is enclosed therein.

Hydrogen fluoride, a decomposition product of the refrigerant, in the system is removed through the reaction with the unsaturated fatty acid residues in the refrigeration oil. Although the unsaturated fatty acid residues give hydrogen fluoride adducts in reaction with hydrogen fluoride, the adducts may be circulated in the system consistently as the refrigeration oil.

Advantageous Effects of Invention

In the refrigeration apparatus according to the present invention, hydrogen fluoride generated in the refrigeration apparatus is removed from the system in reaction with unsaturated bonds in an ester-based refrigeration oil containing an unsaturated fatty acid as constituent fatty acid and thus, degradation of the components used in the refrigeration cycle is suppressed.

BRIEF DESCRIPTION OF DRAWINGS

FIG. 2 is a table showing the relationship between the global warming potential and the mixing ratio of the two-component mixed refrigerants.

DESCRIPTION OF EMBODIMENTS

Figure 1:
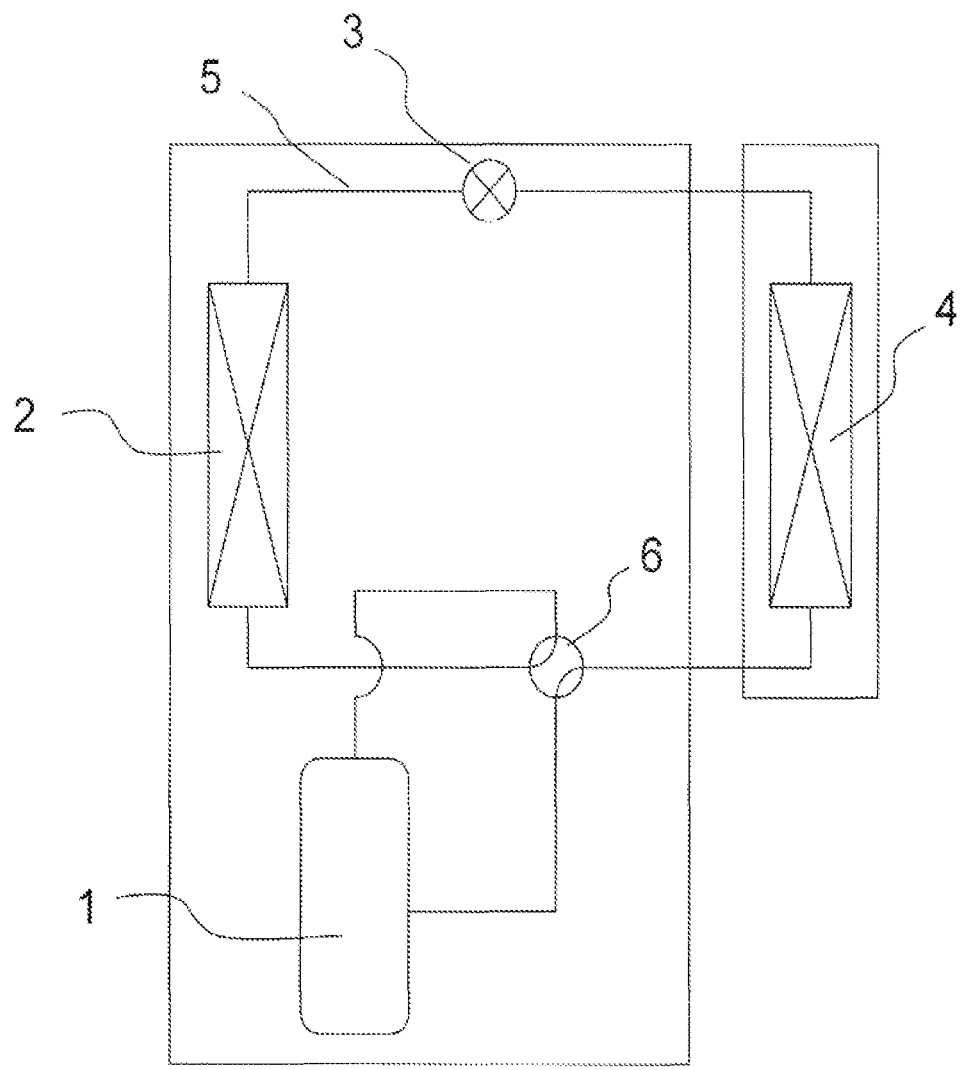
FIG. 1 is a chart showing the cycle of the refrigeration apparatus in embodiment 1 of the present invention.

The invention of the refrigeration apparatus according to claim 1, comprises an ester-based refrigeration oil containing an unsaturated fatty acid as a constituent fatty acid, and a refrigeration cycle having a refrigerant circulation route extending from a compressor, via a condenser, an expansion mechanism and a evaporator, back to the compressor, wherein a refrigerant comprising a single refrigerant of hydrofluoroolefin having a carbon-carbon double bond or a mixed refrigerant containing the hydrofluoroolefin as primary component and a hydrofluorocarbon having no double bond is enclosed into the refrigeration cycle, thereby to prevent degradation of the components used in the refrigeration cycle, because hydrogen fluoride generated in the refrigeration cycle by decomposition of the refrigerant is stabilized, as it is incorporated into the refrigeration oil in reaction with the refrigeration oil.

The "primary component", as used here in the present invention, is at least one component essentially used in the refrigerant of the present invention. The primary component is not necessarily a component highest in component rate.

According to the invention of the refrigeration apparatus of claim 2, the ester-based refrigeration oil containing an unsaturated fatty acid as a constituent fatty acid enclosed in the refrigeration apparatus of claim 1 has both a saturated fatty acid and an unsaturated fatty acid as constituent fatty acids in one molecule, thereby the ester-based refrigeration oil containing a fatty acid residue reactive with hydrogen fluoride generated by decomposition of the refrigerant and also a fatty acid residue non-reactive therewith in one ester oil molecule. Thus, the ester oil after reaction with hydrogen fluoride retains its physical properties without significant change and functions as a refrigeration oil, thereby inhibiting degradation of the components used in the refrigeration cycle.

According to the invention of the refrigeration apparatus of claim 3, the unsaturated fatty acid residue in the ester-based refrigeration oil containing an unsaturated fatty acid as constituent fatty acid that is enclosed in the refrigeration apparatus according to claim 1 does not contain two or more carbon-carbon unsaturated bonds per one unsaturated fatty acid residue, the refrigeration apparatus can prevent polymerization reaction between the unsaturated bonds and thus remove hydrogen fluoride efficiently in reaction therewith. It is thus possible to prevent degradation of the components used in the refrigeration cycle.

According to the invention of the refrigeration apparatus of claim 4, the unsaturated fatty acid residue of the ester-based refrigeration oil containing an unsaturated fatty acid as constituent fatty acid that is enclosed in the refrigeration apparatus according to claim 1 is a branched-chain fatty acid, the ester bond portion is easily surrounded by neighboring substituent groups. Thus, the ester-based refrigeration oil itself is resistant to hydrolytic reaction, possibly suppressing generation of organic acids and degradation of the components used in the refrigeration cycle.

According to the invention of the refrigeration apparatus of claim 5, the ester-based refrigeration oil containing an unsaturated fatty acid as constituent fatty acid that is enclosed in the refrigeration apparatus according to claim 1 is miscible with the refrigerant, and thus hydrogen fluoride generated by decomposition of the refrigerant can be trapped more efficiently, suppressing degradation of the components used in the refrigeration cycle.

According to the invention of the refrigeration apparatus of claim 6, the refrigerant enclosed in the refrigeration apparatus of claim 1 is a two- or three-component mixed refrigerant adjusted to have a global warming potential of not more than 750, it is possible to minimize the adverse effects on global warming, even if the unrecovered refrigerant is discharged into air.

Hereinafter, favorable embodiments of the present invention will be described with reference to drawings, but it should be understood that the present invention is not restricted by these embodiments.

Embodiment 1

FIG. 1 is a chart showing the cycle of the refrigeration apparatus in embodiment 1 of the present invention. As shown in FIG. 1, the refrigeration apparatus has a compressor 1 for compressing the refrigerant, a condenser 2 for condensing the refrigerant, an expansion mechanism 3, such as of expansion valve, for expanding the refrigerant, and an evaporator 4 for vaporization of the refrigerant, and additionally tubing 5 and a four-way valve 6 connecting the units to each other and an accumulator (not shown in the Figure), and contains a refrigerant and a refrigeration oil as working fluids.

The refrigerant enclosed in the refrigeration apparatus is a two- or three-component mixed refrigerant containing a hydrofluoroolefin, such as tetrafluoropropene (HFO1234yf) as primary component and difluoromethane (HFC32) or/and pentafluoroethane (HFC125), which are added to make the global warming potential (GWP) of the refrigerant 5 or more and 750 or less, desirably 5 or more and 300 or less. It may be a single hydrofluoroolefin refrigerant (GWP=4).

FIG. 2 is a table showing the relationship between the global warming potential and the mixing ratio of the two-component refrigerants of tetrafluoropropene mixed with difluoromethane or pentafluoroethane. Specifically as shown in FIG. 2, in the case of a two-component mixture, difluoromethane should be mixed in an amount of 44 wt % or less to make the GWP not larger than 300 when tetrafluoropropene and difluoromethane are mixed, pentafluoroethane should be used in an amount of 21.3 wt % or less to make the GWP not larger than 750 when tetrafluoropropene and pentafluoroethane are used, and pentafluoroethane should be used in an amount of 8.4 wt or less to make the GWP not larger than 300.

When the refrigerant is a single refrigerant of tetrafluoropropene, it has an extremely favorable GWP of 4. However, as it has a specific volume larger than that of refrigerants mixed with a hydrofluorocarbon, it has smaller refrigeration capacity and thus, demands a larger refrigeration apparatus. In other words, it is possible, by using a refrigerant in combination of a hydrofluoroolefin having a carbon-carbon double bond as primary component and a hydrofluorocarbon having no double bond, to improve particular properties such as refrigeration capacity, compared to single hydrofluoroolefin refrigerants, and make it more easily usable. Thus, in the enclosed refrigerant, the ratio of tetrafluoropropene in the case of mixed refrigerant, or even in the case of using tetrafluoropropene as single refrigerant, may be selected properly according to the purpose of the refrigeration apparatus or the like in which a compressor is installed and the conditions such as the restriction of GWP described above.

It is thus possible to minimize the adverse influence of the unrecovered refrigerant on global warming, even if it is released into air. In addition, the mixed refrigerant mixed at the rate above can make the temperature difference smaller, even though it is a non-azeotropic mixture refrigerant, and shows the behavior similar to that of pseudo-azeotropic mixture refrigerants, and thus, can improve the performance of the refrigeration apparatus and the coefficient of performance (COP).

Furthermore, the refrigeration oil enclosed in the compressor 1, which is miscible with the refrigerant, contains an ester-based refrigeration oil containing an unsaturated fatty acid as its constituent fatty acid. Typical examples of the unsaturated fatty acid-containing ester-based refrigeration oils include ester oils containing a saturated fatty acid and an unsaturated fatty acid as constituent fatty acids in one molecule and mixtures of an ester oil containing a saturated fatty acid as constituent fatty acid and an ester oil having an unsaturated fatty acid as at least one constituent fatty acid in one molecule.

The ester-based refrigeration oil of the present invention is produced in dehydration reaction between a polyvalent alcohol and a saturated or unsaturated fatty acid. A polyvalent alcohol such as neopentylglycol, pentaerythritol or dipentaerythritol is used according to the viscosity of the refrigeration oil. The other saturated fatty acid for use is, for example, a straight-chain fatty acid such as hexanoic acid, heptanoic acid, nonanoic acid or decanoic acid or a branched-chain fatty acid such as 2-methylhexanoic acid, 2-ethylhexanoic acid and 3,5,5-trimethylhexanoic acid. It should be noted that the straight-chain fatty acid-containing ester oils are superior in sliding properties but inferior in hydrolytic resistance, while the branched-chain fatty acid-containing ester oils are slightly inferior in sliding properties but favorably resistant to hydrolysis.

In one embodiment of the ester-based refrigeration oil of the present invention, part of the saturated fatty acids, which is fatty acids constituting the ester oil compatible with the above refrigerant, is replaced with an unsaturated fatty acid. Such an ester oil can be produced in dehydration reaction of a mixture of a polyvalent alcohol and saturated and unsaturated fatty acids. The number of the unsaturated bonds in the unsaturated fatty acid is not particularly limited, but presence of two or more unsaturated bonds is unfavorable, because it leads to excessively high reactivity and easy polymerization thereof. Triple bond-containing compounds are mostly highly reactive and thus unfavorable.

Favorable examples of the unsaturated fatty acids for use in the present invention include unsaturated fatty acid having an unsaturated bond number of 1 such as 2-hexenoic acid, 3-hexenoic acid, 6-heptenoic acid, 10-undecylenoic acid, 2-octenoic acid, 2,2-dimethyl-4-pentenoic acid, 2-ethyl-2-hexenoic acid, citronellic acid and the like.

Another embodiment of the ester-based refrigeration oil of the present invention is a mixture of an ester oil containing a saturated fatty acid as a constituent fatty acid and an ester oil containing at least one unsaturated fatty acid as its constituent fatty acid in one molecule. In such a case, the content of the unsaturated fatty acid residues in the ester oil can be adjusted arbitrarily.

The ester oil containing an unsaturated fatty acid as a constituent fatty acid has an action to capture the acid remaining in the refrigeration apparatus and thus to inhibit sludge generation. In addition, the unsaturated bond has an action to coordinate with iron on the sliding face, inhibiting corrosion of iron.

The refrigeration oil of the present invention may contain, as needed, various additives such as extreme-pressure additives such as triphenyl phosphate and tricresyl phosphate, oiliness improver such as long chain alcohols, antioxidants such as dibutyl para-cresol and naphthylamine, acid scavengers such as epoxy-containing compounds, and antifoams, as properly selected.

Although the present invention has been described as a refrigeration apparatus mainly for use as an air conditioner for air conditioning, the advantageous effect of the refrigeration apparatus is the same, if it is a non-open-type refrigeration apparatus, and it is needless to say that it is a technology applicable, for example, to freezing refrigerators, freezers, dehumidifiers, heat-pump drying washing machines, heat-pump water heaters, and beverage vending machines.

INDUSTRIAL APPLICABILITY

The refrigeration apparatus of the present invention, which can remove hydrogen fluoride generated in the refrigeration apparatus from the system in reaction with the unsaturated bonds in the refrigeration oil and suppress degradation of the components used in the refrigeration cycle, can be applicable to air conditioners, car air conditioners, water heaters, freezing refrigerators, freezers, dehumidifiers, heat-pump drying washing machines, heat-pump water heaters, beverage vending machines and others.

The invention claimed is:

1. A refrigeration apparatus, comprising:
an ester-based refrigeration oil, and
a refrigeration cycle having a refrigerant circulation route extending from a compressor, via a condenser, an expansion mechanism and a evaporator, back to the compressor,
wherein a refrigerant comprising a single refrigerant of hydrofluoroolefin having a carbon-carbon double bond or a mixed refrigerant containing the hydrofluoroolefin as primary component and a hydrofluorocarbon having no double bond is enclosed in the refrigeration cycle, and
wherein the ester-based refrigeration oil consists of an ester oil having both a saturated fatty acid residue and an unsaturated fatty acid residue in one molecule.

2. The refrigeration apparatus according to claim 1, wherein the unsaturated fatty acid residue does not contain two or more carbon-carbon unsaturated bonds.

3. The refrigeration apparatus according to claim 1, wherein the unsaturated fatty acid residue has a branched-chain.

4. The refrigeration apparatus according to claim 1, wherein the ester oil is compatible with the refrigerant.

5. The refrigeration apparatus according to claim 1, wherein the enclosed refrigerant comprises a two- or three-component mixed refrigerant containing a hydrofluoroolefin tetrafluoropropene as primary component and additionally difluoromethane or/and pentafluoroethane at a ratio adjusted to give a global warming potential of 5 or more and 750 or less, desirably 5 or more and 300 or less.

6. The refrigeration apparatus according to claim 1, wherein the unsaturated fatty acid residue of the ester oil removes a hydrogen fluoride formed in the refrigerant by forming a hydrogen fluoride adduct, and the hydrogen fluoride adduct is circulated in the refrigeration cycle.

7. The refrigeration apparatus according to claim 1, wherein the unsaturated fatty acid residue of the ester oil captures an acid remaining in the refrigeration cycle, and an unsaturated bond of the ester oil coordinates on a sliding face in the refrigeration cycle.

* * * * *